June 9, 1942.  A. J. JEROME ET AL  2,285,719
WEIGHING DEVICE
Filed Dec. 30, 1938  3 Sheets-Sheet 2
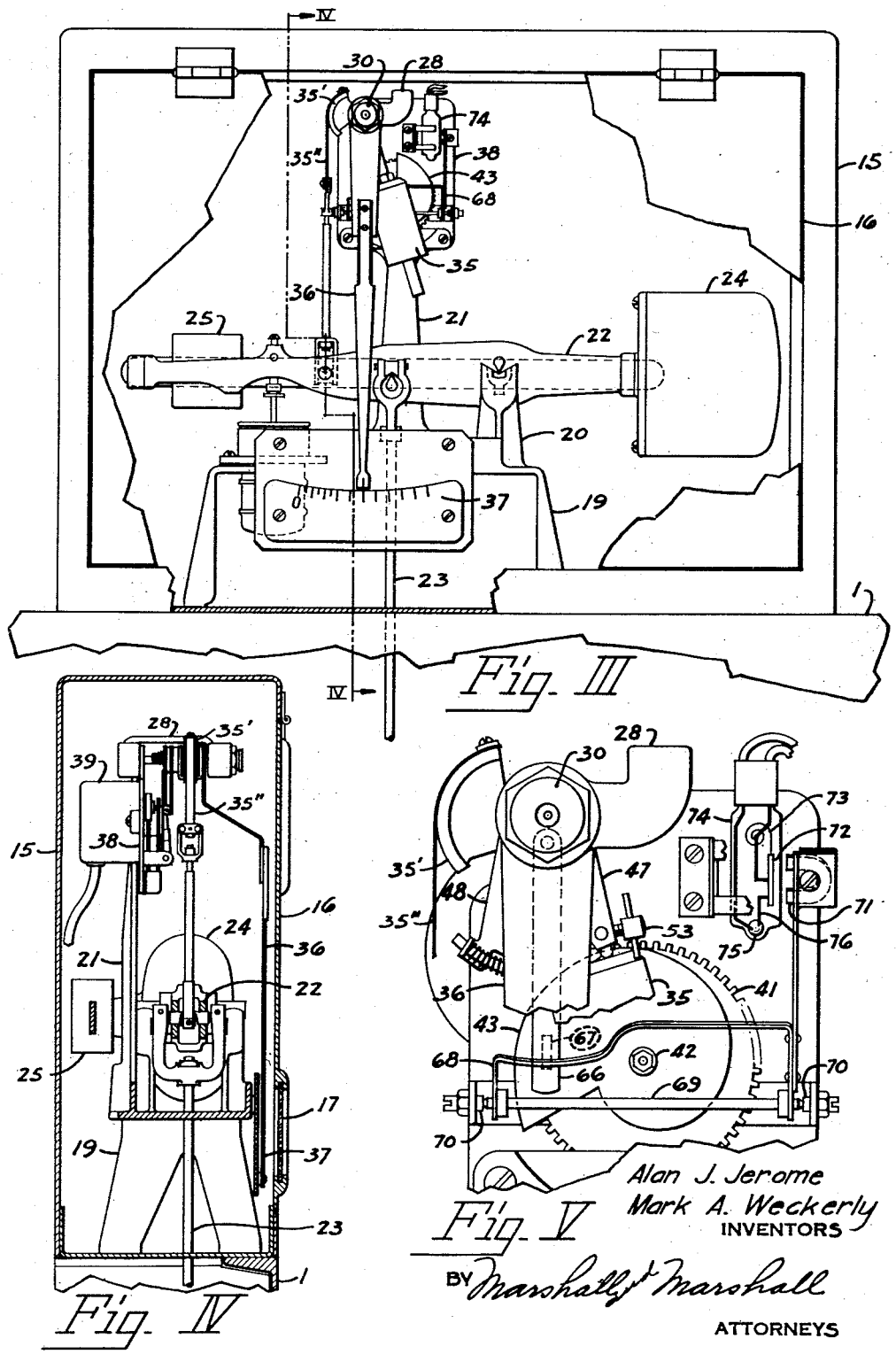
Fig. III
Fig. IV
Fig. V
Alan J. Jerome
Mark A. Weckerly
INVENTORS
BY Marshall & Marshall
ATTORNEYS June 9, 1942.  A. J. JEROME ET AL  2,285,719
WEIGHING DEVICE
Filed Dec. 30, 1938  3 Sheets-Sheet 3
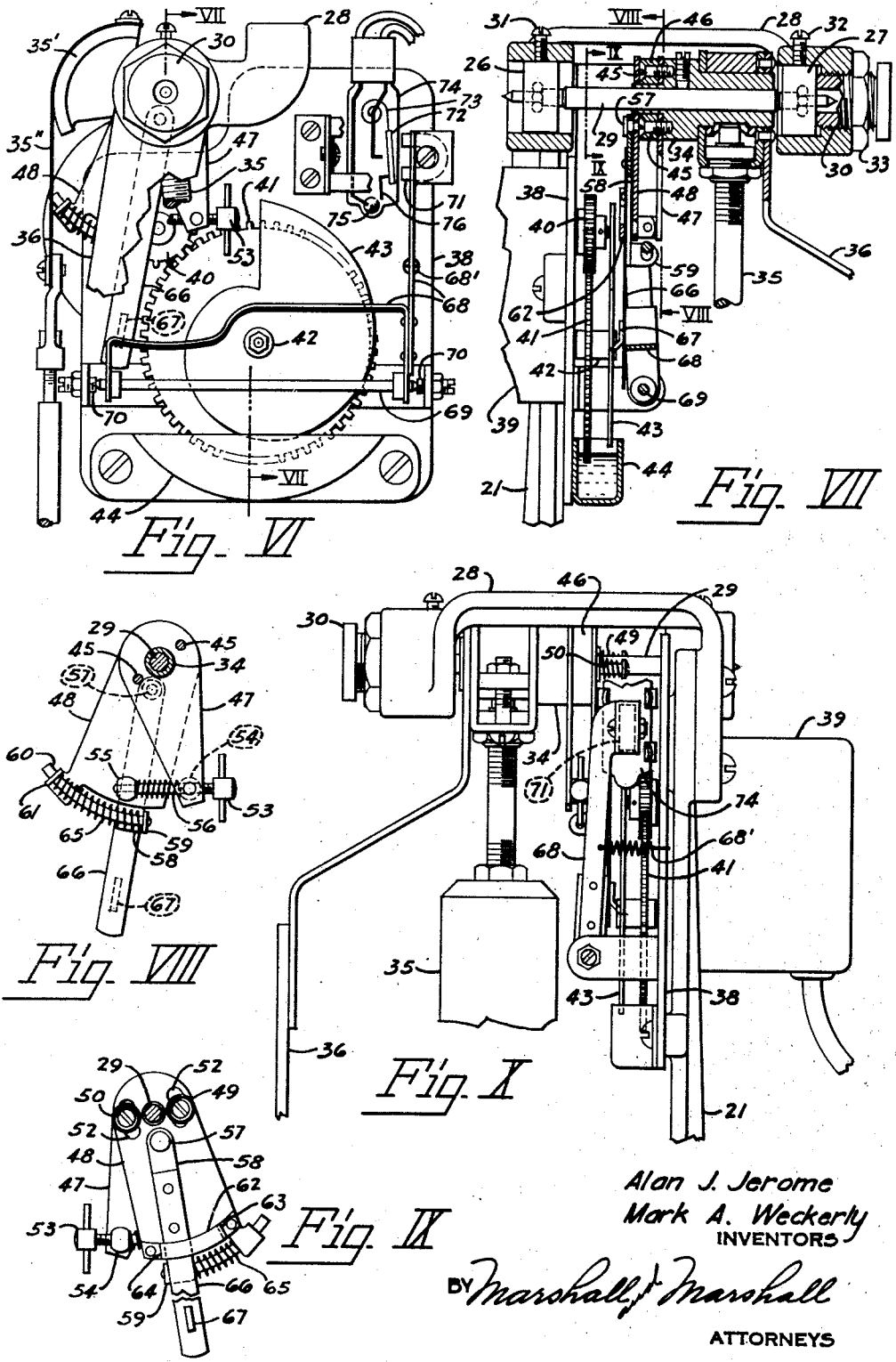
Alan J. Jerome
Mark A. Weckerly
INVENTORS
BY Marshall & Marshall
ATTORNEYS Patented June 9, 1942

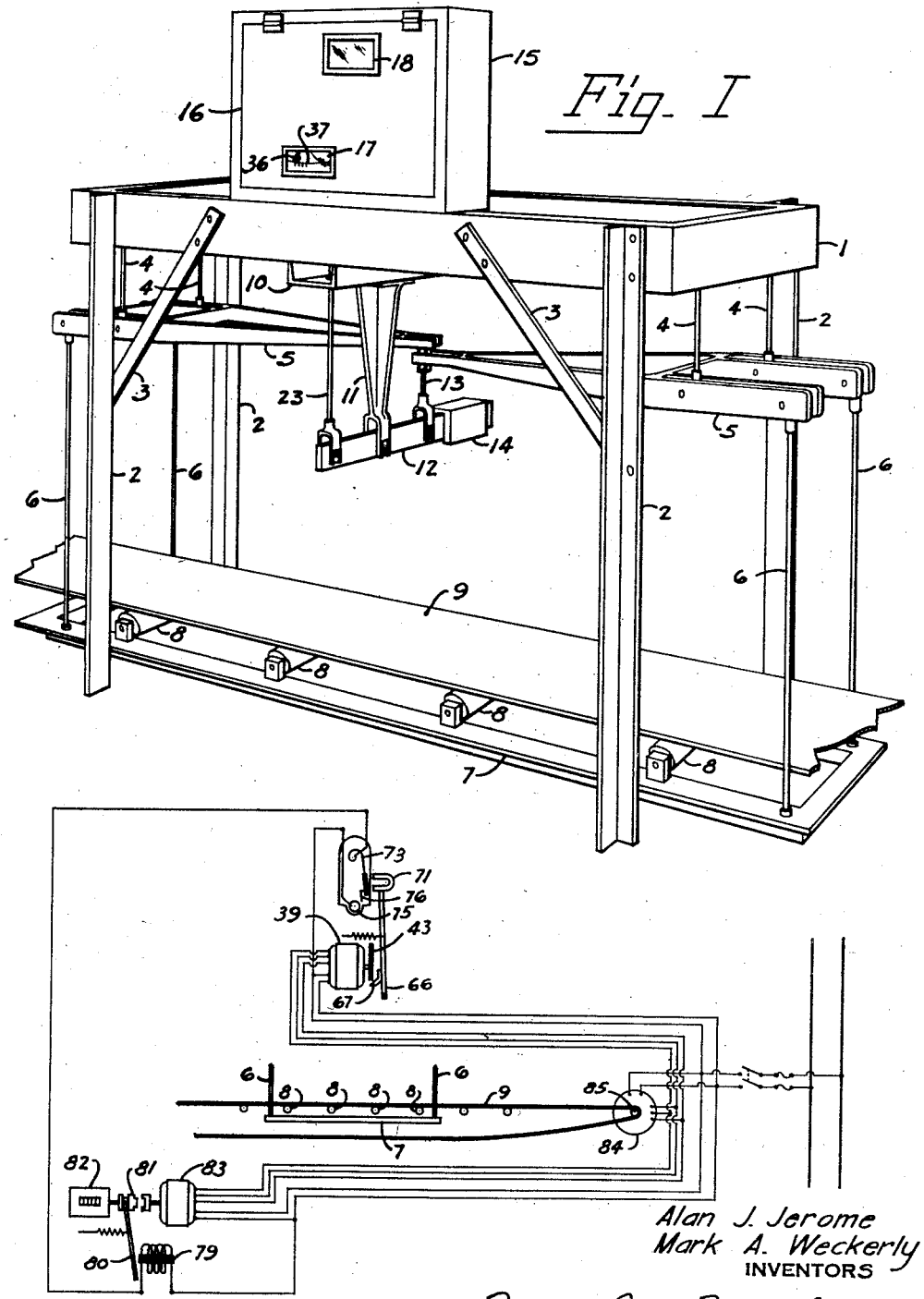

2,285,719

UNITED STATES PATENT OFFICE 2,285,719

WEIGHING DEVICE

Alan J. Jerome and Mark A. Weckerly, Toledo, Ohio, assignors to Toledo Scale Company, Toledo, Ohio, a corporation of New Jersey Application December 30, 1938, Serial No. 248,374

5 Claims. (Cl. 265—28)

This invention relates to weighing devices, and particularly to devices for indicating total weights carried by conveyors.

One of its objects is to produce a weight totalizing device having an automatic load-counterbalance of simple form which actuates totalizing mechanism through a practicable arrangement of relatively few movable parts.

Another object is to produce a device for totalizing weights of materials moving over belt conveyors in which inaccuracies resulting from effects of belt tension are minimized.

Another object is to provide a weight totalizing device in which connections from the weighing mechanism to the totalizing mechanism are free of inaccuracies resulting from friction and lost motion.

Another object is to provide a weight totalizing device adaptable for weighing with great accuracy either light or heavy moving loads.

And still another object is the provision of a weight totalizing device which is economical to manufacture and easy to install and adjust and is not liable to failure in operation.

Other objects and advantages will be apparent from the following description, in which reference is had to the accompanying drawings illustrating a preferred embodiment of the invention and wherein similar reference numerals designate similar parts throughout the several views.

In the drawings:

Fig. I is a view in perspective of a weighing device embodying the invention;

Fig. II is a wiring diagram showing the circuits employed to connect the weighing device to a totalizing counter;

Fig. III is an enlarged front elevational view showing the load-counterbalancing mechanism of the weighing device and circuit controlling means operated thereby;

Fig. IV is a left side elevational view, partly in section along the line IV—IV of Fig. III;

Fig. V is a further enlarged fragmentary front elevational view, showing the circuit controlling means in detail, parts being in circuit closing position;

Fig. VI is a front elevational view, enlarged to the same extent as Fig. V, showing the circuit controlling means in open circuit position, some of the parts being broken away;

Fig. VII is a left side view in section along the line VII—VII of Fig. VI;

Fig. VIII is a front elevational view of a subassembly of circuit controller parts, some of which are shown in section along the line VIII—VIII of Fig. VII;

Fig. IX is a fragmentary rear elevational view of the subassembly, some of the parts being shown in section along the line IX—IX of Fig. VII and some of the parts being broken away; and Fig. X is a right side elevational view of the load-counterbalance and circuit controlling means.

In the form of weighing device illustrated, a rectangular frame 1 is supported upon legs 2, the structure being strengthened by braces 3. Suspended, by fulcrum rods 4, beneath the frame 1 is a pair of load levers 5; and suspended, by means of load supporting rods 6, beneath the load levers 5 is a conveyor section 7 provided with rollers 8 over which travels a conveyor belt 9 adapted to carry materials to be weighed.

Fixed to the lower side of the frame 1 is a crossbar 10, of channel section, to which is fixed a depending bracket 11, and fulcrumed in the bifurcated lower end of the depending bracket 11 is a force direction reversing lever 12, one end of which is connected, through a link 13, to the noses of both load levers 5. A counterweight 14 adjustably mounted on the force direction reversing lever 12 serves to counterbalance part of the weight of the conveyor section 7, the rollers 8 and the belt 9.

Surmounting the rectangular frame 1 is a cabinet 15 having a door 16 with glazed windows 17 and 18, and erected within the cabinet 15 is a platform 19 from which rises a beam fulcrum stand 20 and a pendulum fulcrum stand 21. A beam 22 is fulcrumed upon the beam fulcrum stand and is connected, by means of a pull rod 23, to the nose of the force direction reversing lever 12. The beam 22 carries at one end a loading box 24, containing heavy metal, and a poise 25 which is adjustable along the beam for preliminary balance.

A ball bearing 26 is mounted in the upper end of the pendulum fulcrum stand 21 and a second ball bearing 27 is mounted in the forward end of an arm 28 which is fastened to the upper end of the pendulum fulcrum stand and extends forwardly therefrom. The ball bearings 26 and 27 rotatably support a shaft 29 having tenons formed at its ends for engagement with the balls of the ball bearings, there being beveled shoulders at the inner ends of the tenons which also engage the balls to limit endwise movement of the shaft.

For the purpose of facilitating adjustment of the spacing between the ball bearings, a hollow screw 30 is threaded into the forward end of the arm 28. With the ball bearing 26 held in place by means of a setscrew 31, the hollow screw 30 may be turned to move the ball bearing 27 and shaft 29 axially until endwise movement of the shaft is properly limited, care being taken not to force the balls and beveled shoulders together so tightly as to cause interference with free turning movement of the shaft. After proper adjustment, the ball bearing 27 may be secured in place by tightening a setscrew 32, and the hollow screw 30 may be secured against turning by tightening a lock nut 33.

Fixed, by means of a set screw, upon the shaft 29 is a sleeve 34 to which is secured a load-counterbalancing pendulum 35, connected in the usual manner through a sector 35′ and a ribbon 35″ to the beam 22. The pendulum carries a pointer 36, the tip of the pointer 36 being visible through the window 17. Also visible through the window 17 is a graduated chart 37 upon which the pointer indicates the weight of the load counterbalanced by the pendulum.

The multiplication of the above described lever system is very high; hence, the vertical movement of the conveyor section 7 under variations in load is very slight, and the portion of the conveyor belt 9 which is supported by the conveyor section 7 remains in substantially the same plane as the contiguous parts of the non-supported portion of the belt. Belt tension thus has no appreciable lifting effect on the load.

In addition to supporting the ball bearings 26 and 27 and the parts carried thereby, the pendulum fulcrum stand 21 supports a vertically disposed plate 38 which serves as a frame upon which cooperating parts of a circuit controlling mechanism are assembled. The circuit controlling mechanism includes a motor 39, which preferably but not necessarily is a synchronous motor, that is secured to the rear side of the plate 38, the motor shaft extending forwardly through an opening in the plate and carrying a pinion 40. The teeth of the pinion 40 mesh with the teeth of a gear wheel 41, the hub 42 of which is rotatably mounted upon a stub shaft projecting forwardly from the plate 38. The hub 42 also carries a cam 43 which rotates with the gear wheel 41. In order to provide lubrication, the gear wheel 41 and the cam 43 may dip into oil contained in a small trough 44.

Fixed, by means of screws 45 and a spacing collar 46, to the sleeve 34 is a depending arm 47. A second depending arm 48 is frictionally held against the rear side of the spacing collar 46 by means of springs 49 and 50 that surround screws which pass through arcuate slots 52 in the upper end of the second depending arm 48. In order that the angular relation of the second depending arm 48 to the load-counterbalancing pendulum 35 may be readily adjusted, an adjusting screw 53 is threaded through the boss 54 rockably mounted adjacent the lower end of the depending arm 47, the end of the adjusting screw being journaled in another boss 55 rockably mounted adjacent the lower end of the second depending arm 48, axial movement of the adjusting screw 53 in the boss 55 being limited by a shoulder and upset tip formed upon the end of the adjusting screw. End play of the adjusting screw in the boss 55 is prevented by an expansive coil spring 56 which surrounds the adjusting screw and presses against the bosses 54 and 55.

Pivoted upon a rivet 57 which is set adjacent the upper end of the second depending arm 48 is a strip 58 upon the lower end of which is formed an ear 59, and fixed to the ear 59 is a curved pin 60 which projects through an opening in an ear 61 formed upon the lower end of the second depending arm 48. Overlying the strip 58 is an arcuate guard 62 having offset ends 63 and 64 which are riveted to the second depending arm 48. The strip 58 is capable of swinging about its pivot through the space between the offset ends 63 and 64 of the arcuate guard 62 but is yieldingly held against an abutment formed at the offset end 64 by an expansive coil spring 65 which surrounds the curved pin 60 and presses the ears 59 and 61 apart.

A flexible finger 66 is riveted to the strip 58 so as to constitute an extension thereof, and struck up from the finger 66, adjacent its lower end, is a detent 67. Since the depending arm 47 is fixed to the sleeve 34 to which the pendulum 35 also is fixed, and since the second depending arm 48 after adjustment is held in fixed angular relation to the depending arm 47, and the strip 58 is held against the offset end 64 of the arcuate guard 62 which is riveted to the second depending arm 48, the detent 67 on the finger 66 moves with the pendulum 35, and as the pendulum 35 swings under the influence of variations in load on the belt 9, the detent 67 moves toward or away from the center of the rotating cam 43.

As the cam 43 rotates, it engages the detent 67, and the finger 66 flexes forwardly to permit the cam to turn with its front face in engagement with the detent. If, however, the pendulum should swing suddenly and cause the detent to strike the edge of the cam, the spring 65 will yield and permit the strip 58 to pivot on its rivet and the detent to be pushed laterally by the edge of the cam without damage to the mechanism.

The shape of the cam 43 is such that the number of degrees of revolution during which the detent 67 engages the face of the cam is proportional to the distance of the detent from its position when the pendulum 35 and the pointer 36 are at zero. If the pendulum 35 and pointer 36 are at zero and the angular relation of the depending arm 47 and the second depending arm 48 have been properly adjusted by means of the adjusting screw 53, the outmost point of the cam 43 will just pass the detent 67; if the pendulum 35 and pointer 36 are in quarter capacity position, the cam 43 will engage the detent 67 through one-quarter revolution; if the pendulum 35 and pointer 36 are in half capacity position, the cam 43 will engage the detent through one-half revolution. The time during which the cam engages the detent thus is proportional to any load that is passing over the rollers 8 and the frame 7.

When the cam 43 engages the detent 67 and the flexible finger 66 is bent forwardly, a light tiltable frame 68 which lies against the flexible finger is swung forwardly also. The light tiltable frame 68 is mounted upon a shaft 69 having cone bearings 70 at its ends, and carried by the frame 68 is a small permanent magnet 71 which, when the frame 68 is not tilted forwardly, lies in close proximity to an armature 72 that is hung by a hair spring 73 within a glass bulb 74, in the lower end of which lies a globule of mercury 75. The armature 72 carries a contact member 76 which, when the magnet 71 is adjacent the armature 72, is held away from the globule of mercury as indicated in Fig. VI.

Whenever the light frame 68 is tilted forwardly as the detent 67 is engaged by the cam 43, the magnet 71 is swung away from the armature 72 and the contact member 76 swings into the globule of mercury 75 (see Fig. V) and remains in the globule of mercury until the cam 43 passes out of engagement with the detent 67 and the frame 68 is permitted to be tilted backwardly under the influence of a light retractile spring 68' and carry the magnet 71 into proximity with the armature 72.

When the contact member 76 swings into the globule of mercury 75, it closes a circuit which energizes an electromagnet 79 and thus moves a bar 80 to enmesh a clutch 81 and connect a totalizing counter 82 to a self-synchronous motor 83. The clutch 81 remains enmeshed and the counter 82 continues to be operated by the self-synchronous motor 83 through the part of the revolution of the cam 43 during which the cam engages the detent 67 and thus holds the small permanent magnet 71 away from the armature 72.

The speed of the self-synchronous motor 83 is synchronized with the speed of the belt through circuits interconnecting the motor 83 with a self-synchronous generator 84 connected to a pulley 85 over which the belt passes. Hence, the speed of the counter when connected to the motor 83 is proportional to the speed of the belt, while the periods during which the counter is connected to the motor 83 are proportional to the loads on the lengths of belt that pass successively over the conveyor section 7. The counter thus is turned to an extent corresponding to multiples of the loads times their speeds, and the numerals on the counter are so valued that the weights of the loads on consecutive lengths of the belt are successively added into the amount indicated by the counter numerals.

The embodiment of our invention herein shown and described is to be regarded as illustrative only, and it is to be understood that the invention is susceptible to variation, modification and change within the spirit and scope of the subjoined claims.

Having described our invention, we claim:

1. In a device of the class described, in combination, a conveyor belt, means for supporting a moving portion of said conveyor belt, load levers connected to said supporting means, a force direction reversing lever connected to said load levers, a load-offsetting pendulum connected to said force direction reversing lever, a depending arm fixed to said load-offsetting pendulum, a second depending arm having an abutment thereon, an adjusting screw connecting the first said depending arm to said second depending arm, a strip pivoted upon said second depending arm, a spring yieldingly holding said strip against said abutment, a flexible finger carried by said strip, a detent carried by said flexible finger, a synchronous motor, a cam carried by said synchronous motor and engageable with said detent through a part of each revolution of said cam, the degrees of revolution through which said cam engages said detent being dependent upon the position of said load-offsetting pendulum, a tiltable frame, said flexible finger tilting said tiltable frame when said detent is engaged by said cam, a permanent magnet carried by said tiltable frame, a mercury switch held open by said permanent magnet when said tiltable frame is not tilted by said resilient strip and automatically closing when said tiltable frame is tilted, an electric circuit controlled by said mercury switch, a totalizing counter, a counter operating self-synchronous motor, a clutch for connecting and disconnecting said counter operating self-synchronous motor to said totalizing counter, means energized by said electric circuit to cause said clutch to connect said counter operating self-synchronous motor to said totalizing counter when said mercury switch is closed.

2. In a device of the class described, in combination, a conveyor belt, lever mechanism supporting a moving portion of said conveyor belt, a load-offsetting pendulum connected to said lever mechanism, an arm connected to said pendulum, a second arm having an abutment thereon, an adjusting screw connecting the first said arm to said second arm, a strip pivoted upon said second arm, a spring yieldingly holding said strip against said abutment, a flexible finger carried by said strip, a detent carried by said flexible finger, a synchronous motor, a cam rotated by said synchronous motor and engageable with said detent through a part of each revolution of said cam, the degrees of revolution through which said cam engages said detent being dependent upon the position of said load-offsetting pendulum, a tiltable frame, said flexible finger tilting said frame when said detent is engaged by said cam, a switch closed by the tilting of said tiltable frame by said flexible finger, an electric circuit closed by the closing of said switch, a totalizing counter, a counter operating self-synchronous motor, means energized by the closing of said circuit for connecting said counter operating self-synchronous motor to said totalizing counter.

3. In a device of the class described, in combination, a conveyor belt, lever mechanism supporting a portion of said conveyor belt, a single load-offsetting pendulum connected to said lever mechanism, a member yieldably connected to said load-offsetting pendulum, a flexible finger carried by said member, a detent carried by said flexible finger, a synchronous motor, a cam rotated by said synchronous motor and engageable with said detent through a part of each revolution of said cam, the degrees of revolution through which said cam engages said detent being dependent upon the position of said load-offsetting pendulum, a tiltable frame, said flexible finger tilting said frame when said detent is engaged by said cam, a switch closed by the tilting of said frame by said flexible finger, a circuit closed by the closing of said switch, a totalizing counter, a counter operating self-synchronous motor, means energized by the closing of said circuit for connecting said counter operating self-synchronous motor to said totalizing counter.

4. In a device of the class described, in combination, a single load-offsetting pendulum, a member adjustably connected to said pendulum and moved therewith, said member having an abutment thereon, a finger carrying member yieldably held against said abutment to move with said load-offsetting pendulum, a flexible finger carried by said finger carrying member, a detent carried by said flexible finger, a synchronous motor, a cam operated by said synchronous motor and engageable with said detent through a part of each revolution of said cam, the degrees of revolution through which said cam engages said detent being dependent upon the position of said load-offsetting pendulum, a tiltable frame, said flexible finger tilting said tiltable frame when said detent is engaged by said cam, a switch closed by the tilting of said tiltable frame, an electric circuit closed by the closing of said switch, a totalizing counter, a counter operating self-synchronous motor, and means energized by the closing of said circuit to connect said counter operating self-synchronous motor to said totalizing counter.

5. In a device of the class described, in combination, a motion multiplying lever system, a conveyor belt supported by said motion multiplying lever system, and a single load-counterbalancing pendulum so connected to said motion multiplying lever system that a very slight vertical movement of said conveyor belt causes a comparatively great angular movement of said single load-counterbalancing pendulum; a flexible member carried by said load-counterbalancing pendulum and partaking of the angular movement thereof, a rotatable cam engageable with said flexible member, the degrees of revolution through which said cam engages said flexible member being dependent upon the position of said load-counterbalancing pendulum, a synchronous motor for rotating said cam, a sealed mercury switch, magnetic means for operating said sealed mercury switch, and means operated by said flexible member when engaged with said cam for operating said magnetic switch operating means.

ALAN J. JEROME.
MARK A. WECKERLY.